United States Patent
Murano (10) Patent No.: US 11,131,638 B2
(45) Date of Patent: Sep. 28, 2021

(54) CALIBRATION METHOD AND ANALYSIS DEVICE

(71) Applicant: JEOL Ltd., Tokyo (JP)

(72) Inventor: Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 71 days.

(21) Appl. No.: 16/716,859

(22) Filed: Dec. 17, 2019

(65) Prior Publication Data

US 2020/0191733 A1  Jun. 18, 2020

(30) Foreign Application Priority Data

Dec. 18, 2018  (JP) .............. JP2018-236568

(51) Int. Cl.
*G01N 23/207* (2018.01)
*G01N 23/20008* (2018.01)

(52) U.S. Cl.
CPC ... *G01N 23/2076* (2013.01); *G01N 23/20008* (2013.01); *G01N 2223/303* (2013.01)

(58) Field of Classification Search
None
See application file for complete search history.

(56) References Cited

U.S. PATENT DOCUMENTS

2020/0225173 A1* 7/2020 Sato .................. G01N 23/2209

FOREIGN PATENT DOCUMENTS

| JP | 55129737 A | 10/1980 |
|----|------------|---------|
| JP | 2001356050 A | 12/2001 |
| JP | 201258146 A | 3/2012 |

OTHER PUBLICATIONS

Japanese Office Action issued in JP2018236568 dated Nov. 10, 2020.
Extended European Search Report issued in EP Application No. 19216693.2 dated Jul. 2, 2020.
Park et al., Calibration of a flat field soft x-ray grating spectrometer for laser produced plasmas, Review of Scientific Instruments, 81, 10E319, 2010.
Gann et al., Soft x-ray scattering facility at the Advanced Light Souice with real-time data processing and analysis, Review of Scientific Instruments, 83, 045110, 2012.
Lapierre et al., Compact soft x-ray spectrometer for plasma diagnostics at the Heidelberg Electron Beam Ion Trap, Review of Scientific Instruments, 78, 123105, 2007.

* cited by examiner

*Primary Examiner* — Hoon K Song
(74) *Attorney, Agent, or Firm* — The Webb Law Firm (57) ABSTRACT

A calibration method is executed in an analysis device including a spectroscopic element for diffracting a signal generated from a specimen by irradiating the specimen with a primary beam, and a detector that detects the signal diffracted by the spectroscopic element, the detector having a plurality of detection regions arranged in an energy dispersion direction, and the detector detecting the signal to acquire a spectrum of the signal. The calibration method includes determining energy of the signal detected in each of the plurality of detection regions based on a positional relationship between the specimen and the spectroscopic element and a positional relationship between the spectroscopic element and each of the plurality of detection regions.

5 Claims, 8 Drawing Sheets

CALIBRATION METHOD AND ANALYSIS DEVICE

CROSS-REFERENCE TO RELATED APPLICATION

This application claims priority to Japanese Patent Application No. 2018-236568 filed Dec. 18, 2018, the disclosure of which is hereby incorporated by reference in its entirety.

BACKGROUND OF THE INVENTION

Field of the Invention

The present invention relates to a calibration method and an analysis device.

Description of Related Art

In a known method of performing element analysis, a specimen is irradiated with a primary beam such as an electron beam or an X-ray, and X-rays emitted from the specimen are detected.

Energy-dispersive X-ray spectrometry, in which composition information about a specimen is acquired by irradiating the specimen with an electron beam in an electron microscope and detecting X-rays emitted from the specimen, is an example thereof. Energy-dispersive X-ray spectrometry uses the fact that characteristic X-rays have energy values that are unique to the elements constituting the specimen. On a spectrum of characteristic X-rays acquired by energy-dispersive X-ray spectrometry, element types contained in the specimen are determined from the energy values of the peaks, and the content of each element type is determined from the surface area of the corresponding peak.

Further, a method using a soft X-ray emission spectrometer (SXES), in which a diffraction grating is combined with a charge-coupled device (CCD) camera, is known as another example of the method described above. For example, in an analysis device disclosed in JP-A-2012-58146, a specimen is irradiated with an electron beam, X-rays (soft X-rays) generated from the specimen are focused by a mirror and diffracted by the diffraction grating, the diffracted X-rays (soft X-rays) are received by the X-ray CCD camera, and thus a spectrum is acquired.

In an analysis device including a soft X-ray analyzer, the energy axis of the spectrum is calibrated by measuring a standard specimen in order to acquire a soft X-ray spectrum, and correcting the energy axis from the positions of the peaks (the energy values of the peaks) on the acquired spectrum and logically or empirically determined energy values using a polynomial approximation.

Here, when the energy axis of a spectrum is corrected using a polynomial approximation, as described above, the energy range between the peaks used in the correction can be corrected comparatively precisely. Outside the energy range between the peaks used in the correction, however, the precision deteriorates dramatically.

SUMMARY

According to a first aspect of the invention, there is provided a calibration method executed in an analysis device, the analysis device including:

a spectroscopic element that diffracts a signal generated from a specimen by irradiating the specimen with a primary beam; and a detector that detects the signal diffracted by the spectroscopic element, the detector having a plurality of detection regions arranged in an energy dispersion direction, and the detector detecting the signal to acquire a spectrum of the signal, the calibration method including:

determining energy of the signal detected in each of the plurality of detection regions based on a positional relationship between the specimen and the spectroscopic element and a positional relationship between the spectroscopic element and each of the plurality of detection regions.

According to a second aspect of the invention, there is provided an analysis device including:

a spectroscopic element that diffracts a signal generated from a specimen by irradiating the specimen with a primary beam;

a detector that detects the signal diffracted by the spectroscopic element; and a spectrum generation unit that generates a spectrum of the signal based on an output signal from the detector, the detector having a plurality of detection regions arranged in an energy dispersion direction, and the spectrum generation unit executing processing for determining energy of the signal detected in each of the plurality of detection regions based on a positional relationship between the specimen and the spectroscopic element and a positional relationship between the spectroscopic element and each of the plurality of detection regions.

DETAILED DESCRIPTION

According to an embodiment of the invention, there is provided a calibration method executed in an analysis device, the analysis device including:

a spectroscopic element that diffracts a signal generated from a specimen by irradiating the specimen with a primary beam; and a detector that detects the signal diffracted by the spectroscopic element, the detector having a plurality of detection regions arranged in an energy dispersion direction, and the detector detecting the signal to acquire a spectrum of the signal, the calibration method including:

determining energy of the signal detected in each of the plurality of detection regions based on a positional relationship between the specimen and the spectroscopic element and a positional relationship between the spectroscopic element and each of the plurality of detection regions.

In this calibration method, energy of the signal detected in each of the plurality of detection regions can be determined from a logical expression of the spectroscopic element based on the positional relationship between the specimen and the spectroscopic element and the positional relationship between the spectroscopic element and each of the plurality of detection regions. According to this calibration method, therefore, in contrast to a case in which calibration is performed using a polynomial approximation, for example, energy of the signal detected in each of the plurality of detection regions can be determined precisely over the entire range of energy values that can be detected by the detector.

According to an embodiment of the invention, there is provided an analysis device including:

a spectroscopic element that diffracts a signal generated from a specimen by irradiating the specimen with a primary beam;

a detector that detects the signal diffracted by the spectroscopic element; and a spectrum generation unit that generates a spectrum of the signal based on an output signal from the detector, the detector having a plurality of detection regions arranged in an energy dispersion direction, and the spectrum generation unit executing processing for determining energy of the signal detected in each of the plurality of detection regions based on a positional relationship between the specimen and the spectroscopic element and a positional relationship between the spectroscopic element and each of the plurality of detection regions.

In this analysis device, energy of the signal detected in each of the plurality of detection regions can be determined from a logical expression of the spectroscopic element based on the positional relationship between the specimen and the spectroscopic element and the positional relationship between the spectroscopic element and each of the plurality of detection regions. According to this analysis device, therefore, in contrast to a case in which calibration is performed using a polynomial approximation, for example, energy of the signal detected in each of the plurality of detection regions can be determined precisely over the entire range of energy values that can be detected by the detector.

Embodiments of the invention are described in detail below with reference to the drawings. Note that the following embodiments do not unduly limit the scope of the invention as stated in the claims. In addition, all of the elements described below are not necessarily essential requirements of the invention.

1. ANALYSIS DEVICE

Figure 1:
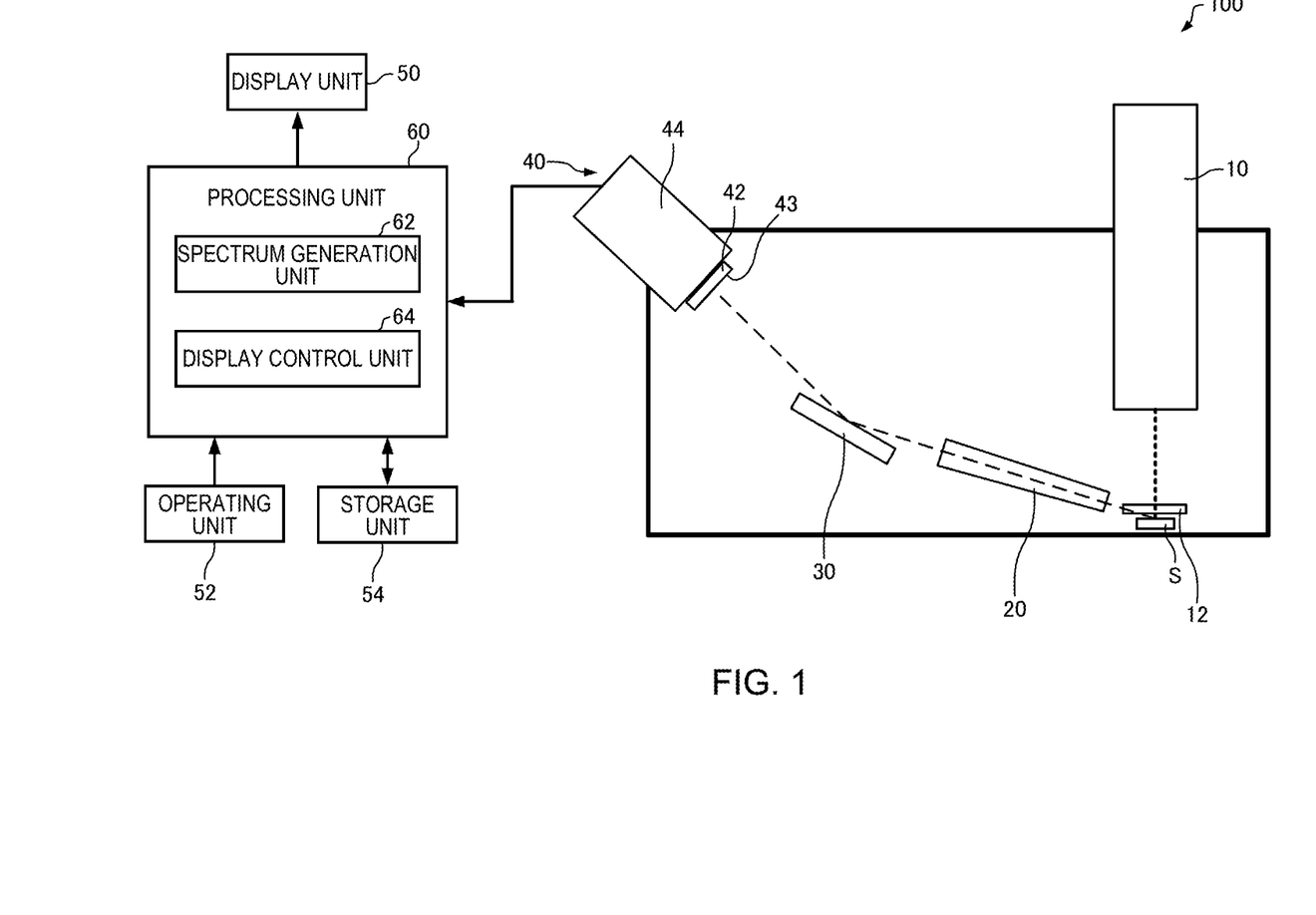
FIG. 1 illustrates a configuration of an analysis device according to an embodiment of the invention.

First, an analysis device according to an embodiment of the invention will be described with reference to the drawings. FIG. 1 illustrates a configuration of an analysis device 100 according to an embodiment of the invention.

As illustrated in FIG. 1, the analysis device 100 includes an electron beam emitting unit 10, an X-ray focusing mirror 20, a diffraction grating 30, an X-ray detection device 40, a display unit 50, an operating unit 52, a storage unit 54, and a processing unit 60.

The electron beam emitting unit 10 irradiates a specimen S with an electron beam. The electron beam emitting unit 10 includes an electron gun serving as an electron beam source, and an illumination-lens system for irradiating the specimen S with the electron beam emitted from the electron gun. The analysis device 100 may also function as a scanning electron microscope for acquiring a scanning electron microscope image (a SEM image).

In the analysis device 100, an electrostatic deflection plate 12 or a magnetic deflector, for example, is disposed above the specimen S. When the specimen S is irradiated with the electron beam, characteristic soft X-rays (also referred to simply as "X-rays" hereafter) are generated from the specimen S. In addition to the X-rays, backscattered electrons, secondary electrons, and so on are also generated from the specimen S. By disposing the electrostatic deflection plate 12, the backscattered electrons, secondary electrons, and so on can be removed. Moreover, the potential applied to the electrostatic deflection plate 12 is variable, and by applying the potential in accordance with the accelerating voltage of the electron beam, background can be reduced.

The X-ray focusing mirror 20 focuses the X-rays emitted from the specimen S and guides the focused X-rays to the diffraction grating 30. By focusing the X-rays using the X-ray focusing mirror 20, the intensity of the X-rays entering the diffraction grating 30 can be increased. As a result, the measurement time can be reduced, and the S/N ratio of the spectrum can be improved.

The X-ray focusing mirror 20 is constituted by two mutually opposing mirrors, for example. The interval between the two mirrors is narrow on the specimen S side (the entrance side) and wide on the diffraction grating 30 side (the exit side). Thus, the quantity of X-rays entering the diffraction grating 30 can be increased.

The diffraction grating 30 diffracts the X-rays that are generated from the specimen S when the specimen S is irradiated with the electron beam. When the X-rays enter the diffraction grating 30 at a specific angle, X-rays (diffracted X-rays) diffracted into respective wavelengths (energy values) can be acquired. The diffraction grating 30 is an unequal interval diffraction grating, for example, in which grooves are formed at unequal intervals for the purpose of aberration correction. The diffraction grating 30 is configured such that when X-rays enter at a large incident angle, the focus of the diffracted X-rays is formed on a detection plane 43 of an image sensor 42 rather than on the Rowland circle.

The X-ray detection device 40 is configured to include the image sensor 42 (an example of a detector) and a control device 44.

The image sensor 42 detects the X-rays (diffracted X-rays) diffracted by the diffraction grating 30. The image sensor 42 is highly sensitive to soft X-rays. The image sensor 42 is a charge-coupled device (CCD) image sensor, a complementary MOS (CMOS) image sensor, or the like, for example. The image sensor 42 is a back-illuminated CCD image sensor, for example. The image sensor 42 is positioned so that the detection plane 43 is aligned with an image plane of the diffracted X-rays.

Figure 2:
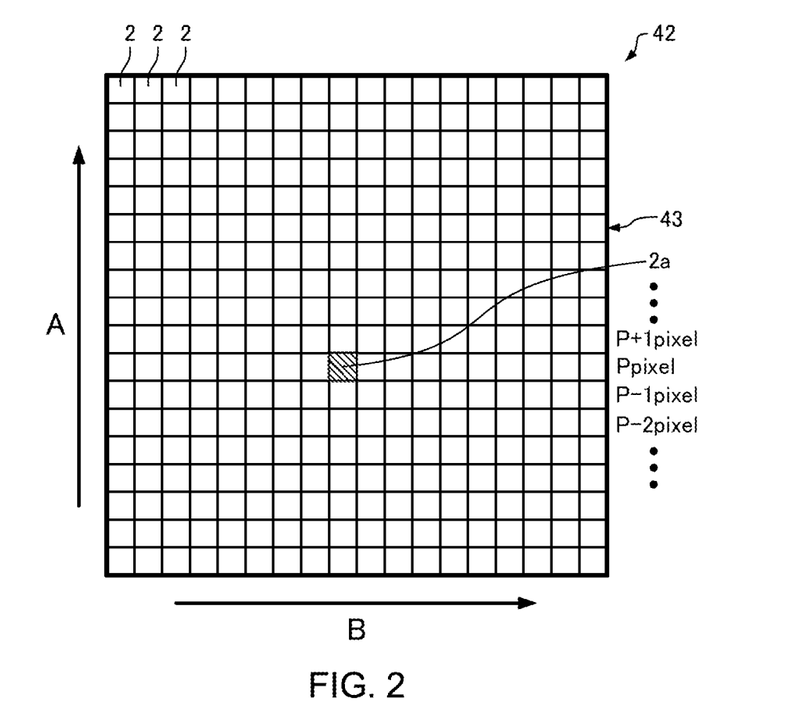
FIG. 2 is a schematic plan view illustrating a detection plane of an image sensor.

FIG. 2 is a schematic plan view illustrating the detection plane 43 of the image sensor 42.

As illustrated in FIG. 2, the image sensor 42 includes a plurality of detection regions 2 arranged in an energy dispersion direction A. Hence, in the image sensor 42, X-rays diffracted by the diffraction grating 30 so as to have different energy values (wavelengths) can be detected independently. Each detection region 2 corresponds to one pixel of the image sensor 42, for example. Note that the detection region 2 may also be constituted by a plurality of adjacent pixels of the image sensor 42.

In the example illustrated in the drawing, the plurality of detection regions 2 are also arranged in an X-ray spreading direction B of the image sensor 42. The spreading direction B is orthogonal to the energy dispersion direction A. In the plurality of detection regions 2 arranged in the spreading direction B, X-rays having identical energy values (wavelengths) can be detected.

The control device 44 controls the image sensor 42 in FIG. 1. The control device 44 supplies power to the image sensor 42. Further, the control device 44 executes processing for transmitting an output signal from the image sensor 42 to the processing unit 60. The control device 44 includes a cooling mechanism for cooling the image sensor 42 and thereby controls the temperature of the image sensor 42.

The display unit 50 outputs an image generated by the processing unit 60. The display unit 50 can be realized by a display such as a liquid crystal display (LCD), for example.

The operating unit 52 executes processing for converting instructions from a user into signals and transmitting the signals to the processing unit 60. The operating unit 52 can be realized by an input device such as buttons, keys, a touch panel display, or a microphone, for example.

The storage unit 54 stores programs and data used by the processing unit 60 in various calculation processing and various control processing. The storage unit 54 is also used as a work area of the processing unit 60. The storage unit 54 can be realized by a random access memory (RAM), a read only memory (ROM), a hard disk, and so on, for example.

The processing unit 60 executes processing for generating an X-ray spectrum based on the output signal from the image sensor 42. Further, the processing unit 60 executes control for displaying the generated spectrum on the display unit 50. The functions of the processing unit 60 can be realized by executing a program using various processors (a central processing unit (CPU) or the like). The processing unit 60 includes a spectrum generation unit 62 and a display control unit 64.

The spectrum generation unit 62 executes processing for determining the energy (wavelength) of the X-ray detected in each of the plurality of detection regions 2 based on a positional relationship between the specimen S and the diffraction grating 30 and a positional relationship between the diffraction grating 30 and each of the plurality of detection regions 2. The spectrum generation unit 62 then executes processing for acquiring information indicating the intensity of the X-ray detected in each the plurality of detection regions 2 from the output signal output by the image sensor 42 and generating a spectrum based on the intensities.

The display control unit 64 executes control for displaying the spectrum generated by the spectrum generation unit 62 on the display unit 50. Note that the processing executed by the spectrum generation unit 62 and the display control unit 64 will be described in detail below.

2. CALIBRATION METHOD

Next, a calibration method according to an embodiment of the invention will be described. A method of calibrating the energy axis of the spectrum by determining the energy of the X-ray detected in each of the plurality of detection regions 2 will be described below.

Note that calibration of the energy axis includes a case in which an axis representing the positions of the detection regions 2 is converted into an energy axis and a case in which a set energy axis is corrected in order to set a new energy axis. The case in which an axis representing the positions of the detection regions 2 is converted into an energy axis will be described below.

The calibration method according to this embodiment of the invention includes a step of determining the energy of the X-ray detected in each of the plurality of detection regions 2 based on the positional relationship between the specimen S and the diffraction grating 30 and the positional relationship between the diffraction grating 30 and each of the plurality of detection regions 2.

Figure 3:
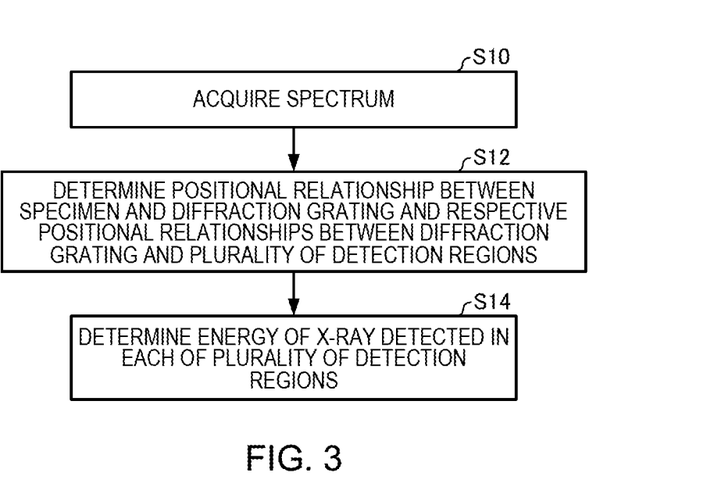
FIG. 3 is a flowchart illustrating an example of a calibration method according to an embodiment of the invention.

FIG. 3 is a flowchart illustrating an example of the calibration method according to this embodiment of the invention.

(1) Spectrum Acquisition (S10)

Using the analysis device 100, a standard specimen is measured and a spectrum is acquired. In the analysis device 100, when the specimen S is irradiated with an electron beam by the electron beam emitting unit 10, X-rays are generated from the specimen S. The X-rays generated from the specimen S are focused by the X-ray focusing mirror 20 and then enter the diffraction grating 30. The X-rays entering the diffraction grating 30 exit at exit angles corresponding to the wavelengths (energy values) thereof and then enter the detection plane 43 of the image sensor 42. The X-rays entering the detection plane 43 are detected by the plurality of detection regions 2 arranged in the energy dispersion direction A. Information indicating the intensity of the X-ray detected in each of the plurality of detection regions 2 can be acquired from the output signal output by the image sensor 42.

Figure 4:
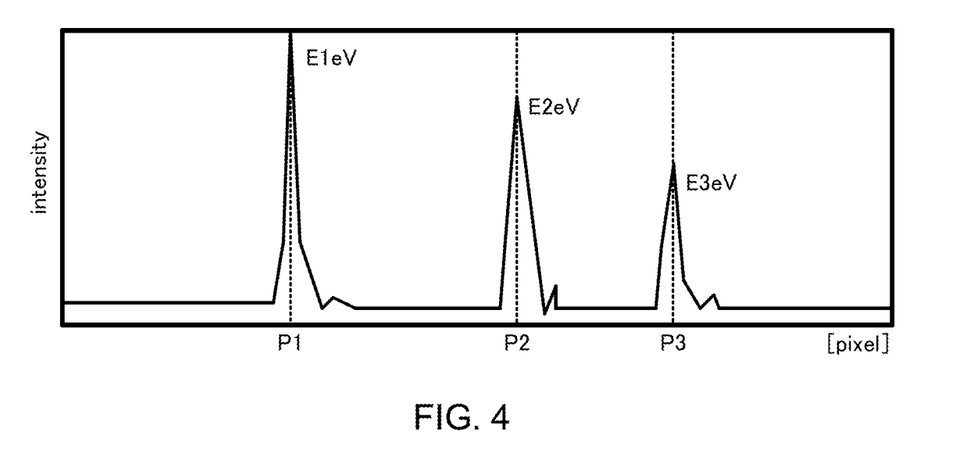
FIG. 4 schematically illustrates a spectrum acquired by measuring a standard specimen.

FIG. 4 schematically illustrates a spectrum acquired by measuring the standard specimen. Here, the energy axis has not been calibrated, and therefore the horizontal axis of the spectrum in FIG. 4 indicates the positions of the detection regions 2 in the energy dispersion direction A. The horizontal axis of the spectrum in FIG. 4 represents the positions of the detection regions 2 such that a single detection region 2 corresponds to a single pixel. The vertical axis of the spectrum in FIG. 4 represents the intensities of the X-rays detected in the detection regions 2.

The energy values of the peaks of the spectrum in FIG. 4 are measured using a standard specimen and are therefore known. The standard specimen is a specimen in which the energy values of the peaks appearing on the spectrum acquired when the specimen is measured by the analysis device 100 are known.

On the spectrum in FIG. 4, peaks appear respectively in a P1 pixel, a P2 pixel and a P3 pixel. The spectrum in FIG. 4 is measured using a standard specimen, and therefore the energy values of the three peaks are known. In the example in FIG. 4, the energy value of the peak of the P1 pixel is E1 eV, the energy value of the peak of the P2 pixel is E2 eV, and the energy value of the peak of the P3 pixel is E3 eV.

(2) Determination of Positional Relationship Between Specimen and Diffraction Grating and Positional Relationship Between Diffraction Grating and Each of Detection Regions (S12)

Figure 5:
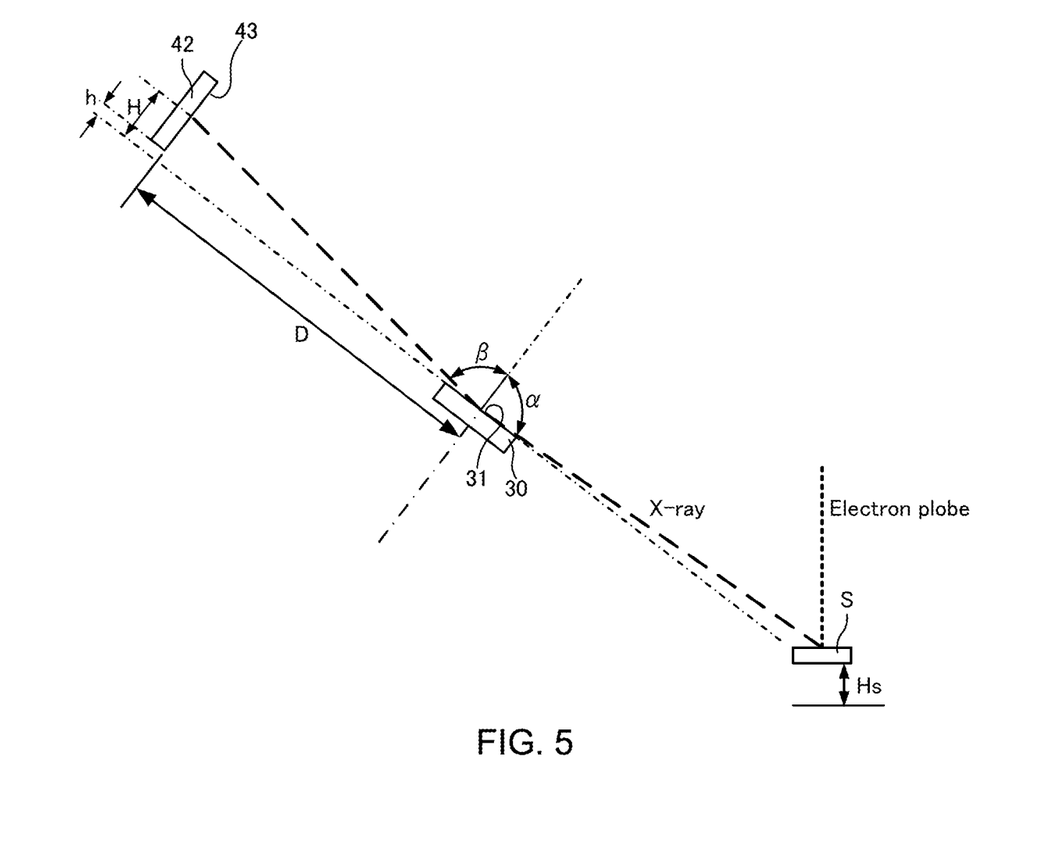
FIG. 5 illustrates a positional relationship between a specimen and a diffraction grating, and a positional relationship between a diffraction grating and an image sensor.

FIG. 5 illustrates the positional relationship between the specimen S and the diffraction grating 30 and the positional relationships between the diffraction grating 30 and the image sensor 42. Note that for convenience, FIG. 5 only illustrates the specimen S, the diffraction grating 30, and the image sensor 42 among the constituent members of the analysis device 100.

The logical expression of the diffraction grating is expressed by the following expression.

$$d(\sin \alpha - \sin \beta) = m\lambda$$

Here, d is the grating constant (the grating period) of the diffraction grating 30. m is the diffraction order. Note that the diffraction order m is basically 1. $\lambda$ is the wavelength of the X-ray. $\alpha$ is the incident angle at which the X-ray enters the diffraction grating 30. $\beta$ is the exit angle of the X-ray diffracted by the diffraction grating 30.

Here, a horizontal distance from the diffraction grating 30 to the detection plane 43 is set as D. Further, the height of the imaging position of the X-ray on the detection plane 43, or in other words the height of a detection region 2a (see FIG. 2), which is the detection region 2 in the position where an image of the X-ray is formed, is set as H.

The height H is the height of the detection region 2a relative to a diffraction plane 31 of the diffraction grating 30. The direction of the height H, illustrated in FIG. 5, matches the energy dispersion direction A in FIG. 2. For example, the pitch (the pixel pitch) of the detection regions 2 in the energy dispersion direction A is 13.5 μm, for example, and when the position of the detection region 2a in the energy dispersion direction A corresponds to a P pixel, the height H of the detection region 2a is expressed by the following expression (1).

$$H = h + P \times 13.5 \times 10^{-3} \text{ (mm)} \quad (1)$$

Here, h is the height of the detection plane 43 (the image sensor 42) relative to the diffraction plane 31 of the diffraction grating 30.

The exit angle $\beta$ is acquired from the horizontal distance D from the diffraction grating 30 to the detection plane 43 and the height H of the detection region 2a in which an image of the X-ray is formed, and is expressed by the following expression.

$$\tan \beta = H/D$$

Accordingly, the wavelength $\lambda$ of the X-ray is expressed by the following expression (2).

$$d(\sin \alpha - \sin(\tan^{-1}(H/D))) = \lambda \quad (2)$$

The wavelength $\lambda$ of the X-ray has the relationship of the following expression and can therefore be converted into the energy E of the X-ray.

$$\lambda \approx 1240/E$$

With the incident angle $\alpha$, the distance D, and the height H of expression (2) set as parameters, optimal solutions of the parameters are determined by the method of least squares or the like using data sets of peak positions and energy values, acquired from the spectrum in FIG. 4. On the spectrum in FIG. 4, a set of the P1 pixel and E1 eV, a set of the P2 pixel and E2 eV, and a set of the P3 pixel and E3 eV are acquired. Hence, using these data sets, the optimal solutions of the incident angle $\alpha$, the distance D, and the height H in expression (2) are determined.

The incident angle $\alpha$, the distance D, and the height h are parameters relating to the optical arrangement of the diffraction grating 30 and the image sensor 42. In other words, these parameters relate to the positional relationship (the optical positional relationship) between the specimen S and the diffraction grating 30 and the positional relationship (the optical positional relationship) between the diffraction grating 30 and the image sensor 42.

For example, the incident angle $\alpha$ can be adjusted by modifying the position (the height) Hs of the specimen S. In other words, the incident angle $\alpha$ is a parameter determined according to the positional relationship between the specimen S and the diffraction grating 30.

Further, the distance D can be adjusted by modifying the position of the diffraction grating 30 or the position of the image sensor 42. Furthermore, the height h can be adjusted by modifying the position of the image sensor 42 (the position of the detection plane 43). In other words, the distance D and the height h are parameters determined according to the positional relationship between the diffraction grating 30 and the image sensor 42.

(3) Determination of Energy of X-ray Detected in Each of Plurality of Detection Regions (S14)

In expression (2), the energy (the wavelength) of the X-ray detected in each of the plurality of detection regions 2 arranged in the energy dispersion direction A can be determined univocally by acquiring the optimal solutions of the incident angle $\alpha$, the distance D, and the height H.

Figure 6:
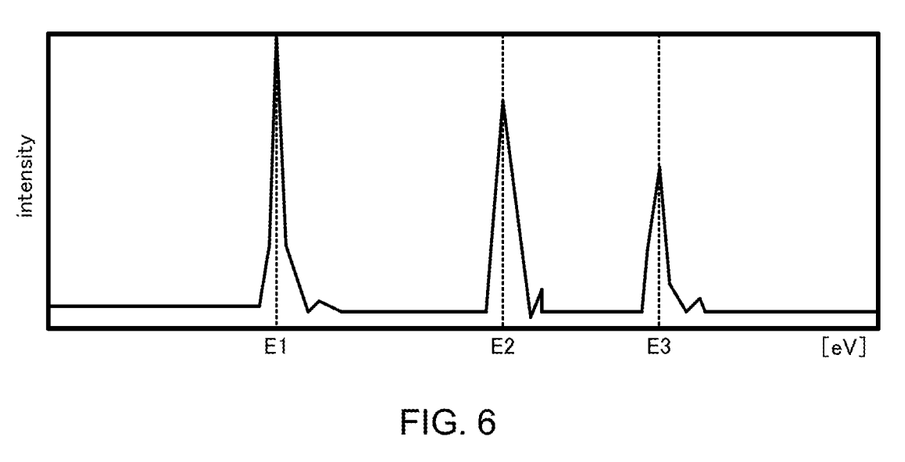
FIG. 6 is a graph on which the horizontal axis of the spectrum in FIG. 4 has been converted from positions of detection regions into energy values of X-rays.

FIG. 6 is a graph on which the horizontal axis of the spectrum in FIG. 4 has been converted from the positions of the detection regions 2 (pixels) into the energy values (eV) of the X-rays.

As illustrated in FIG. 6, by determining the energy of the X-ray detected in each of the plurality of detection regions 2 arranged in the energy dispersion direction A from expression (2), the horizontal axis of the spectrum can be converted from an axis representing the positions of the detection regions 2 into an energy axis. In so doing, the energy axis of the spectrum can be calibrated.

3. PROCESSING

Figure 7:
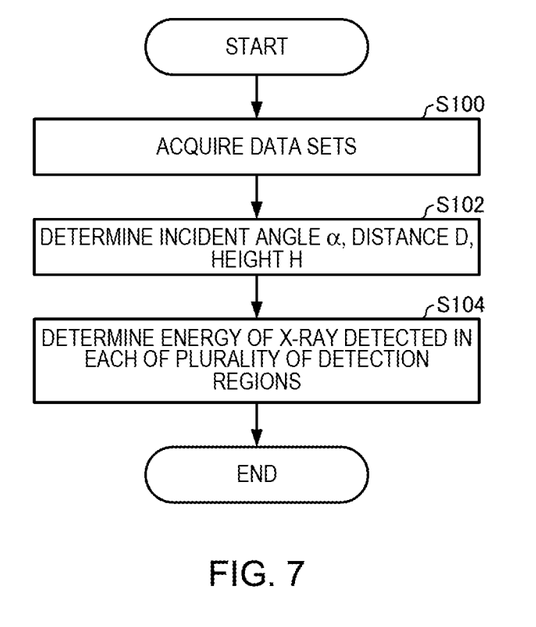
FIG. 7 is a flowchart illustrating an example of calibration processing.

Next, the processing executed by the processing unit 60 of the analysis device 100 will be described. First, processing for calibrating the energy axis of the spectrum will be described. FIG. 7 is a flowchart illustrating an example of calibration processing executed by the processing unit 60 of the analysis device 100.

First, the spectrum generation unit 62 acquires data sets of peak positions and energy values (S100).

The data sets are acquired by measuring a standard specimen using the analysis device 100. For example, the analysis device 100 measures the standard specimen, whereupon the spectrum generation unit 62 acquires the spectrum of the standard specimen, illustrated in FIG. 4, and acquires information indicating the peak positions. Further, information indicating the energy values corresponding to the peak positions is acquired from a database of the energy values of the peaks (X-ray types) that are acquired by measuring the standard specimen. This database may be stored in the storage unit 54 in advance. Alternatively, the user may input information indicating the energy values in the peak positions through the operating unit 52.

Next, the spectrum generation unit 62 uses the acquired data sets to determine the optimal solutions of the parameters, namely the incident angle $\alpha$, the distance D, and the height H of expression (2), by the method of least squares or the like (S102). The determined incident angle $\alpha$, distance D, and height H are stored in the storage unit 54.

Next, the spectrum generation unit 62 determines the energy of the X-ray detected in each of the plurality of detection regions 2 by applying the determined incident angle $\alpha$, distance D, and height H to expression (2) (S104).

More specifically, the spectrum generation unit 62 determines the energy detected in each of the plurality of detection regions 2 by determining the height H using expression (1) and determining the wavelength λ from expression (2) using the determined height H.

By executing the processing described above, the energy axis of the spectrum can be calibrated.

Figure 8:
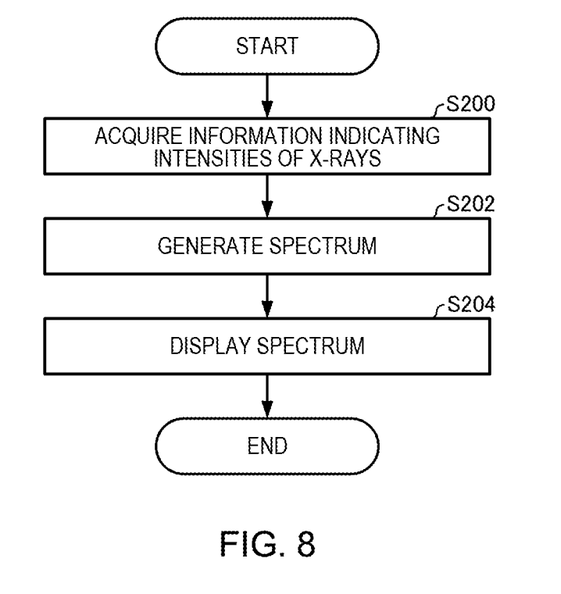
FIG. 8 is a flowchart illustrating an example of spectrum generation processing.

Next, spectrum generation processing will be described. FIG. 8 is a flowchart illustrating an example of the spectrum generation processing executed by the processing unit 60 of the analysis device 100.

Using the analysis device 100, the specimen S is measured and a spectrum is acquired. In the analysis device 100, when the specimen S is irradiated with an electron beam by the electron beam emitting unit 10, X-rays are generated from the specimen S. The X-rays generated from the specimen S are focused by the X-ray focusing mirror 20 and then enter the diffraction grating 30. The X-rays that enter the diffraction grating 30 exit at exit angles corresponding to the wavelengths (the energy values) thereof and then enter the detection plane 43 of the image sensor 42. The X-rays that enter the detection plane 43 are detected by the plurality of detection regions 2 arranged in the energy dispersion direction A. The output signal output by the image sensor 42 is transmitted to the processing unit 60.

The spectrum generation unit 62 acquires information indicating the intensity of the X-ray detected in each of the plurality of detection regions 2 based on the output signal from the image sensor 42 (S200).

Next, the spectrum generation unit 62 generates a spectrum based on the acquired information indicating the intensity of the X-ray detected in each of the plurality of detection regions 2 (S202). At this time, the spectrum generation unit 62 sets the energy axis of the spectrum based on the energy of the X-ray detected in each of the plurality of detection regions 2, which was determined in step S104.

Next, the display control unit 64 executes control to display the spectrum generated by the spectrum generation unit 62 on the display unit 50 (S204). As a result, the spectrum in FIG. 6, on which the horizontal and vertical axes respectively represent the energy values and intensities of the X-rays, is displayed on the display unit 50.

4. EFFECTS

The calibration method according to this embodiment has the following effects, for example.

The calibration method according to this embodiment includes a step of determining the energy of the X-ray detected in each of the plurality of detection regions 2 based on the positional relationship between the specimen S and the diffraction grating 30 and the positional relationship between the diffraction grating 30 and each of the plurality of detection regions 2. More specifically, in the calibration method according to this embodiment, the energy of the X-ray detected in each of the plurality of detection regions 2 is determined using expression (2).

Hence, with the calibration method according to this embodiment, the energy of the X-ray detected in each of the plurality of detection regions 2 can be determined from the logical expression of the diffraction grating based on the positional relationship between the specimen S and the diffraction grating 30 and the positional relationship between the diffraction grating 30 and each of the plurality of detection regions 2. With the calibration method according to this embodiment, therefore, therefore, in contrast to a case in which calibration is performed using a polynomial approximation, for example, the energy of the X-ray detected in each of the plurality of detection regions 2 can be determined precisely over the entire range of energy values that can be detected by the image sensor 42. As a result, the energy axis of the spectrum can be calibrated precisely.

When the energy axis of the spectrum is corrected using a polynomial approximation, for example, the precision deteriorates dramatically outside the energy range between the peaks used in the correction. Moreover, when the energy axis of the spectrum is corrected using a polynomial approximation, if the number of peaks used in the correction is small, the set constant necessarily decreases, and as a result, the precision likewise deteriorates.

With the calibration method according to this embodiment, however, the energy axis of the spectrum can be corrected from the logical expression of the diffraction grating, and therefore the problems that occur with a polynomial approximation, as described above, do not arise. Hence, the energy values of the detected X-rays can be determined precisely in all of the detection regions 2 arranged in the energy dispersion direction A, for example.

The calibration method according to this embodiment also includes a step of measuring a standard specimen using the analysis device 100 and acquiring the spectrum of the standard specimen, and a step of determining the positional relationship between the specimen S and the diffraction grating 30 and the positional relationship between the diffraction grating 30 and each of the plurality of detection regions 2 based on the acquired spectrum of the standard specimen. Hence, the energy of the X-ray detected in each of the plurality of detection regions 2 can be determined using expression (2).

Note that in the calibration method according to this embodiment, as described above, the incident angle α, the distance D, and the height H are determined from the spectrum of the standard specimen in step S12 in FIG. 3. In actuality, therefore, the position (the height) of the specimen S, the position of the diffraction grating 30, and the position of the image sensor 42 can be adjusted based on the determined incident angle α, distance D, and height H (height h).

In the analysis device 100, the spectrum generation unit 62 executes processing for determining the energy of the X-ray detected in each of the plurality of detection regions 2 based on the positional relationship between the specimen S and the diffraction grating 30 and the positional relationship between the diffraction grating 30 and each of the plurality of detection regions 2. With the analysis device 100, therefore, the energy axis can be calibrated more precisely than when calibration is performed using a polynomial approximation, for example.

5. MODIFICATION EXAMPLES

Note that the invention is not limited to the embodiments described above, and various modifications may be applied within the scope of the spirit of the invention.

5.1. First Modification Example

Using expression (2), the set energy axis can be corrected and set as a new energy axis. In other words, the energy axis can be recalibrated.

5.1.1. Calibration Method

A calibration method according to the first modification example will now be described. A calibration method in which the energy axis of the spectrum of the specimen S, which is acquired by measuring the specimen S, is recalibrated will be described below.

The calibration method according to the first modification example further includes a step of measuring the specimen S and acquiring the spectrum of the specimen S using the analysis device 100, a step of setting the energy axis of the spectrum of the specimen S using the energy of the X-ray detected in each of the plurality of detection regions 2, which was determined in the step of determining the energy of the X-ray detected in each of the plurality of detection regions 2, a step of determining the positional relationship between the specimen S and the diffraction grating 30 based on the spectrum of the specimen S, a step of redetermining the energy of the X-ray detected in each of the plurality of detection regions 2 based on determined positional relationship between the specimen S and the diffraction grating 30, and a step of correcting the energy axis of the spectrum of the specimen S based on the redetermined energy of the X-ray detected in each of the plurality of detection regions 2.

Figure 9:
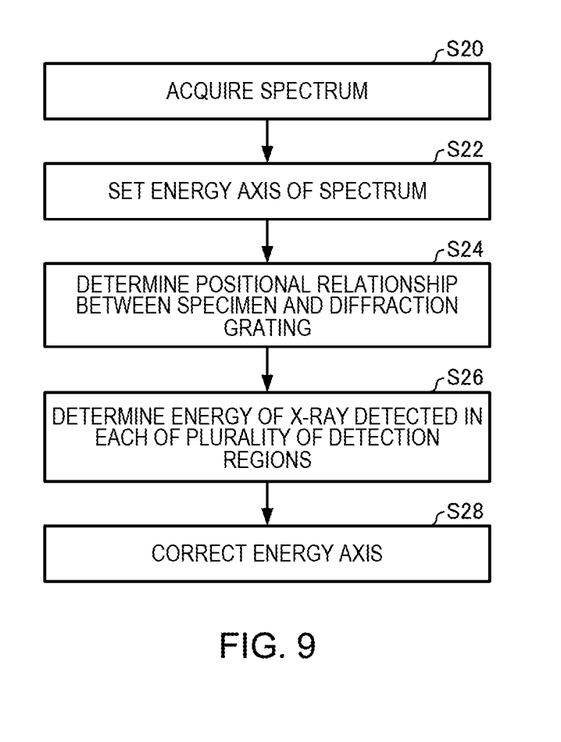
FIG. 9 is a flowchart illustrating an example of processing executed by a processing unit of an analysis device according to a first modification example.

FIG. 9 is a flowchart illustrating an example of the processing executed by the processing unit 60 of the analysis device according to the first modification example.

(1) Spectrum Acquisition (S20)

Using the analysis device 100, the specimen S is measured and a spectrum is acquired. As a result, a spectrum on which the horizontal axis represents the positions of the detection regions 2 in the energy dispersion direction A and the vertical axis represents the intensities of the X-rays detected in the detection regions 2 is acquired.

(2) Setting of Energy Axis of Spectrum (S22)

The energy axis of the spectrum of the specimen S is set. More specifically, the horizontal axis of the spectrum is converted from an axis representing the positions of the detection regions 2 to an energy axis. At this time, the energy axis of the spectrum is set based on the energy of the X-ray detected in each of the plurality of detection regions 2, which was determined in step S14 (see FIG. 3).

Figure 10:
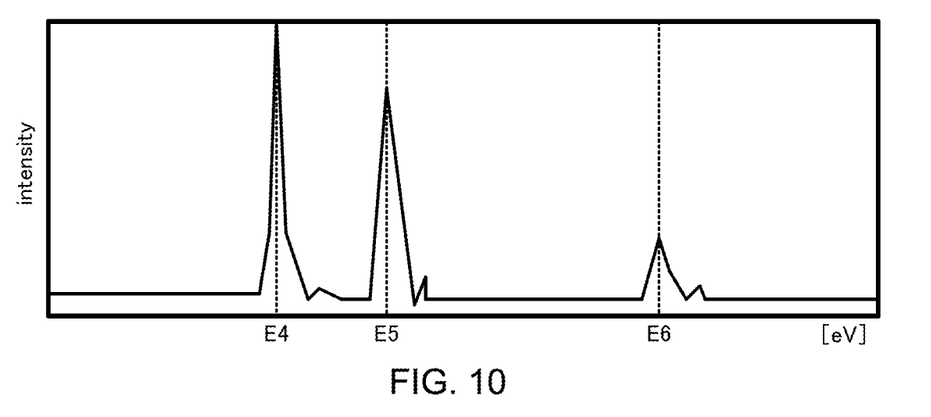
FIG. 10 schematically illustrates an example of a spectrum of a specimen.

FIG. 10 schematically illustrates an example of the spectrum of the specimen S. In this step, as illustrated in FIG. 10, a spectrum on which the horizontal axis represents an energy axis is acquired.

(3) Step for Determining Positional Relationship Between Specimen and Diffraction Grating (S24)

The positional relationship between the specimen S and the diffraction grating 30, or in other words the incident angle α, is determined based on the spectrum of the specimen S.

Here, in the analysis device 100, the main cause of an error in the energy axis is deviation in the height Hs (see FIG. 5) of the specimen S. Therefore, by resetting the incident angle α, which is the parameter relating to the height Hs of the specimen S, in expression (2), the energy axis can be corrected. Note that the distance D and the height H are fixed, and the values thereof determined in step S14 are used.

Figure 11:
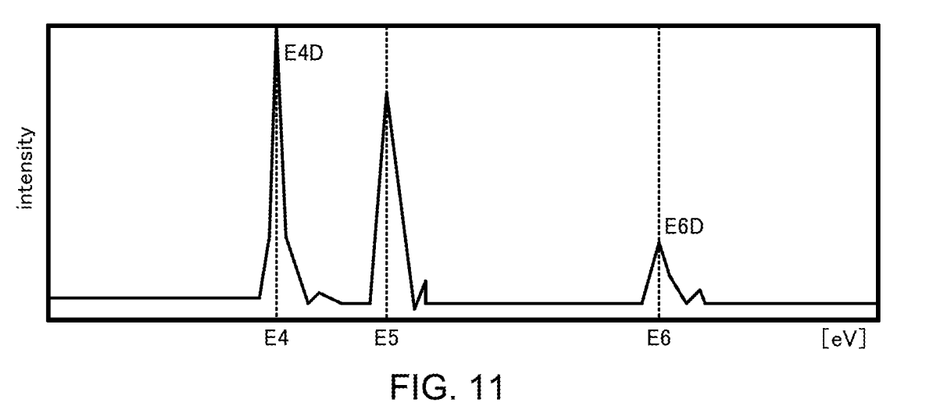
FIG. 11 illustrates a method of determining an incident angle from a spectrum of a specimen.

FIG. 11 illustrates a method for determining the incident angle α from the spectrum of the specimen S.

For example, as illustrated in FIG. 11, the optimal solution of the incident angle α is determined by the method of least squares or the like using expression (2) and using the peaks that have known energy values on the spectrum of the specimen S. On the spectrum in FIG. 11, peaks appear in positions of E4 eV, E5 eV, and E6 eV. On the E4 eV peak, however, the X-ray type is specified, and the energy value of this X-ray type is E4DeV. In other words, the logically or empirically determined energy value of the peak in the position of E4 eV is E4DeV. Similarly, the logically or empirically determined energy value of the peak in the position of E6 eV is E6DeV.

Hence, the incident angle α can be determined from expression (2) based on data sets of the energy values of the peaks on the spectrum and the logically or empirically determined energy values of the peaks. Here, the data sets are (E4, E4D) and (E6, E6D).

(4) Redetermination of Energy of X-ray Detected in Each of Plurality of Detection Regions (S26)

Next, the energy of the X-ray detected in each of the plurality of detection regions 2 is determined from expression (2) using the incident angle α determined in step S24.

(5) Correction of Energy Axis (S28)

The energy axis of the spectrum in FIG. 10 is then corrected based on the redetermined energy of the X-ray detected in each of the plurality of detection regions 2.

Figure 12:
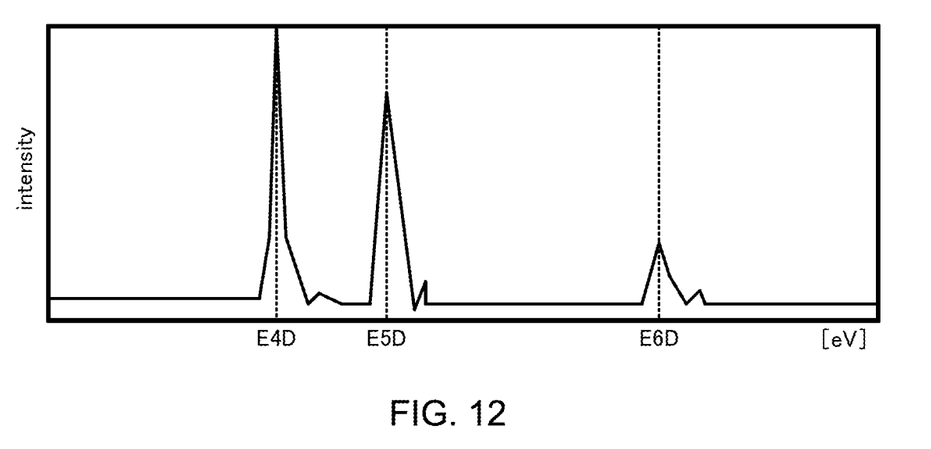
FIG. 12 schematically illustrates a specimen spectrum on which an energy axis has been corrected.

FIG. 12 schematically illustrates the spectrum of the specimen S on which the energy axis has been corrected. As illustrated in FIG. 12, E4 eV, E5 eV, and E6 eV have been corrected to E4DeV, E5DeV, and E6DeV, respectively. Thus, the energy axis of the spectrum of the specimen S can be corrected. By executing the steps described above, the energy axis of the spectrum can be calibrated (recalibrated).

5.1.2. Processing

Figure 13:
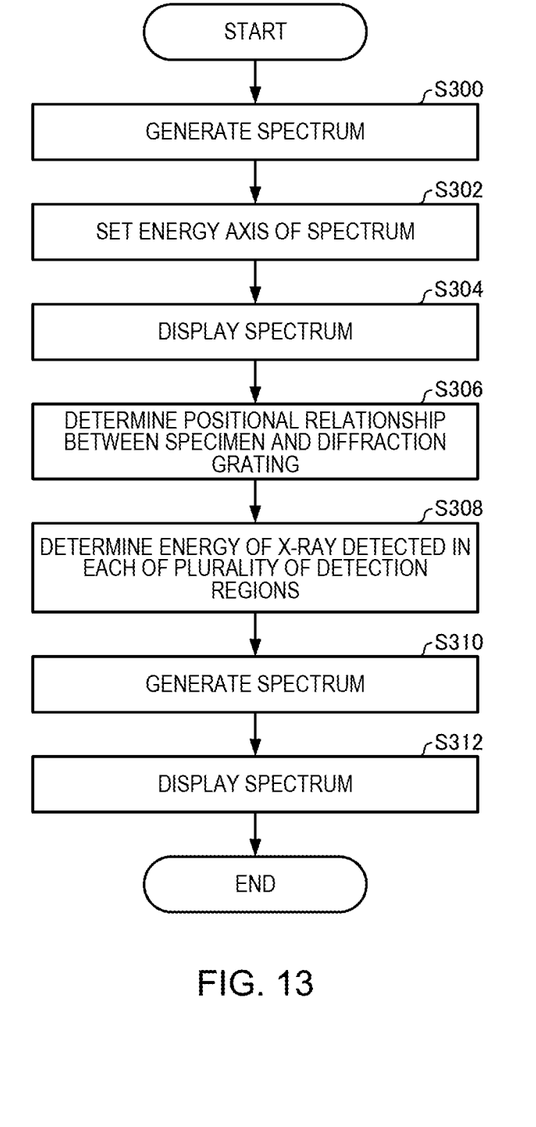
FIG. 13 is a flowchart illustrating an example of processing for correcting an energy axis.

Next, processing for correcting the energy axis of the spectrum will be described. FIG. 13 is a flowchart illustrating an example of processing executed by the processing unit 60 to correct the energy axis.

Using the analysis device 100, the specimen S is measured and a spectrum is acquired. The spectrum generation unit 62 acquires information indicating the intensity of the X-ray detected in each of the plurality of detection regions 2 based on the output signal from the image sensor 42, and generates the spectrum of the specimen S (S300). As a result, a spectrum on which the horizontal axis represents the positions of the detection regions 2 in the energy dispersion direction A and the vertical axis represents the intensities of the X-rays detected in the detection regions 2 is acquired.

Next, the spectrum generation unit 62 sets the energy axis of the spectrum of the specimen S (S302). In other words, the horizontal axis of the spectrum is converted from an axis representing the positions of the detection regions 2 to an energy axis. At this time, the energy axis of the spectrum is set based on the energy of the X-ray detected in each of the plurality of detection regions 2, which was determined in step S104 (see FIG. 7). As a result, a spectrum on which the horizontal axis represents the energy axis, as illustrated in FIG. 10, is acquired.

The display control unit 64 then executes control to display the spectrum of the specimen S in FIG. 10, generated by the spectrum generation unit 62, on the display unit 50 (S304).

Next, the spectrum generation unit 62 determines the positional relationship between the specimen S and the diffraction grating 30, or in other words the incident angle α, based on the spectrum of the specimen S (S306).

The spectrum generation unit 62 determines the optimal solution of the incident angle α by the method of least squares or the like using expression (2) and using the peaks that have known energy values on the spectrum of the specimen S. Information input by the user may be used as information relating to the peaks that have known energy values on the spectrum. For example, the user may specify a peak on the spectrum through the operating unit 52 and input the logically or empirically determined energy value of the specified peak.

Next, the spectrum generation unit 62 redetermines the energy of the X-ray detected in each of the plurality of detection regions 2 from expression (2) using the determined incident angle α (S308).

Next, the spectrum generation unit 62 generates a spectrum based on the energy of the X-ray detected in each of the plurality of detection regions 2, determined in step S308 (S310). The spectrum generation unit 62 resets the energy axis of the spectrum by correcting the energy axis based on the energy of the X-ray detected in each of the plurality of detection regions 2, determined in step S308. As a result, the spectrum in FIG. 12 is generated.

Next, the display control unit 64 executes control to display the spectrum of the specimen S in FIG. 12, which was generated by the spectrum generation unit 62, on the display unit 50 (S312). As a result, the spectrum in FIG. 12 is displayed on the display unit 50. Note that the display control unit 64 may modify only the energy axis of the spectrum in FIG. 10, displayed previously on the display unit 50, and display the modified spectrum on the display unit 50 as the spectrum in FIG. 12.

The calibration method according to the first modification example further includes a step of determining the positional relationship between the specimen S and the diffraction grating 30 based on the spectrum of the specimen S, a step of redetermining the energy of the X-ray detected in each of the plurality of detection regions 2 based on determined positional relationship between the specimen S and the diffraction grating 30, and a step of correcting the energy axis of the spectrum of the specimen S based on the redetermined energy of the X-ray detected in each of the plurality of detection regions 2. Hence, with the calibration method according to the first modification example, the energy axis can be recalibrated using the known peaks on the acquired spectrum. With the calibration method according to the first modification example, therefore, an accurate spectrum can be acquired without remeasuring, for example.

5.2. Second Modification Example

In the embodiments described above, as illustrated in FIG. 1, the X-rays generated from the specimen S are diffracted by the diffraction grating 30, but the spectroscopic element that diffracts the X-rays generated from the specimen S is not limited thereto, and a spectroscopic element capable of continuous energy dispersion of the X-rays may be used instead. A zone plate or the like, for example, may be cited as this type of spectroscopic element. Likewise when a spectroscopic element other than a diffraction grating is used, similarly to a case in which a diffraction grating is used, the energy of the X-ray detected in each of the plurality of detection regions 2 can be determined using a logical expression.

Further, in the embodiments described above, the specimen S is irradiated with an electron beam, but X-rays may be generated from the specimen S by irradiating the specimen S with a primary beam other than an electron beam. An X-ray beam, an ultraviolet beam, or the like may be cited as other types of primary beams.

5.3. Third Modification Example

In the embodiments described above, a case in which the energy axis is calibrated using the spectrum of a standard specimen was described. Here, for example, even with a spectrum of an unknown specimen, by retrieving a matching spectrum from a database, information indicating the logically or empirically determined energy values of the peaks of the spectrum can be acquired in a similar manner to that employed with the spectrum of a standard specimen. Hence, the energy axis can be calibrated in a similar manner to the embodiments described above using a spectrum of an unknown specimen.

5.4. Fourth Modification Example

Figure 14:
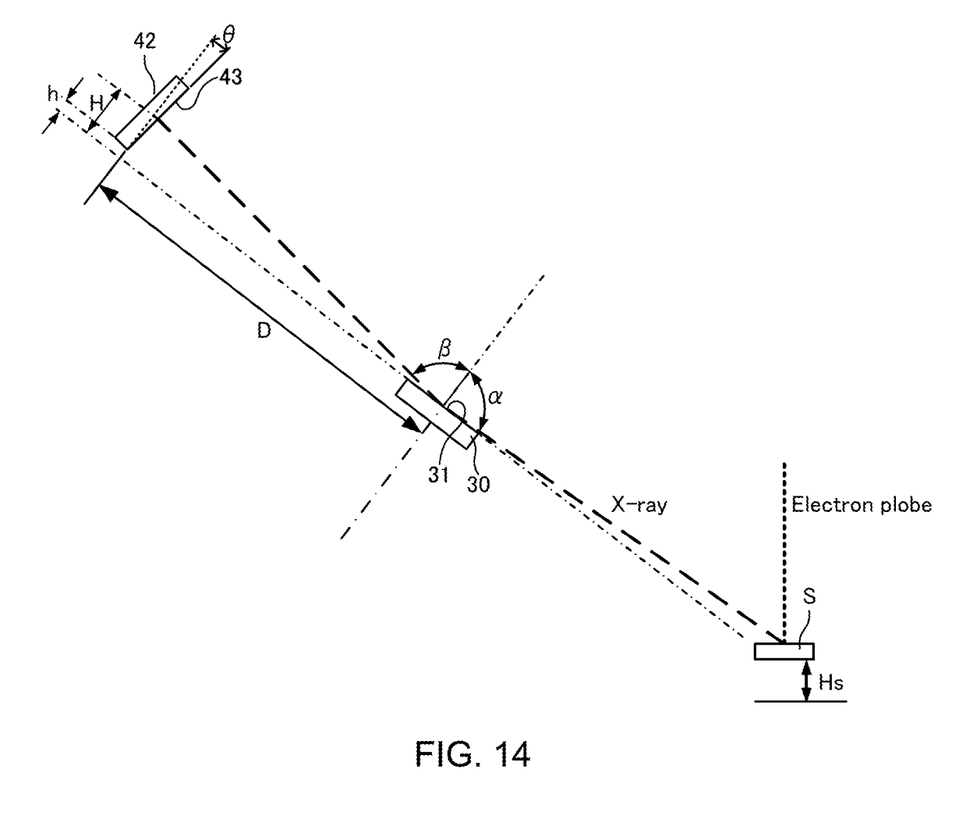
FIG. 14 illustrates a positional relationship between a diffraction grating and an image sensor.

FIG. 14 illustrates the positional relationship between the diffraction grating 30 and the image sensor 42.

In the embodiments described above, as illustrated in FIG. 5, the diffraction plane 31 of the diffraction grating 30 and the detection plane 43 of the image sensor 42 are perpendicular. Accordingly, the height H of the detection region 2 can be determined using expression (1).

As illustrated in FIG. 14, however, the detection plane 43 of the image sensor 42 may be inclined relative to the diffraction plane 31 of the diffraction grating 30. In this case, when the incline of the detection plane 43 relative to the diffraction plane 31 is set as an angle θ, the height H of the detection region 2 is expressed by expression (3) below.

$$H = h + P \times 13.5 \times 10^{-3} \times \cos\theta \text{ (mm)} \quad (3)$$

The height H can be determined using expression (3), whereupon the energy values detected in the detection regions 2 can be determined from expression (2). Hence, even when the detection plane 43 of the image sensor 42 is inclined, calibration can be performed in a similar manner to the embodiments described above.

The above-described embodiments and modifications are examples and the invention is not limited thereto. For example, the embodiments and the modifications may be combined appropriately.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A calibration method executed in an analysis device, the analysis device including:
   a spectroscopic element that diffracts a signal generated from a specimen by irradiating the specimen with a primary beam; and
   a detector that detects the signal diffracted by the spectroscopic element,
   the detector having a plurality of detection regions arranged in an energy dispersion direction, and the detector detecting the signal to acquire a spectrum of the signal, the calibration method comprising:

determining energy of the signal detected in each of the plurality of detection regions based on a positional relationship between the specimen and the spectroscopic element and a positional relationship between the spectroscopic element and each of the plurality of detection regions;

measuring the specimen by using the analysis device to acquire a spectrum of the specimen;

setting an energy axis of the spectrum of the specimen by using energy of the signal detected in each of the plurality of detection regions, the energy of the signal detected in each of the plurality of detection regions having been determined in the step of determining energy of the signal detected in each of the plurality of detection regions;

determining the positional relationship between the specimen and the spectroscopic element based on the spectrum of the specimen;

redetermining energy of the signal detected in each of the plurality of detection regions based on the determined positional relationship between the specimen and the spectroscopic element; and correcting the energy axis of the spectrum of the specimen based on the redetermined energy of the signal detected in each of the plurality of detection regions.

2. The calibration method according to claim 1, wherein the signal is an X-ray, and the spectroscopic element is a diffraction grating that diffracts the X-ray.

3. The calibration method according to claim 2, wherein the energy of the signal detected in each of the plurality of detection regions is determined by using a following expression:

$$d(\sin \alpha - \sin(\tan^{-1}(H/D))) = \lambda$$

where d is a grating constant of the diffraction grating, α is an incident angle at which the X-ray enters the diffraction grating, H is a height of each of the detection regions relative to a diffraction plane of the diffraction grating, D is a horizontal distance from the diffraction grating to a detection plane of the detector, and X is a wavelength of the X-ray.

4. The calibration method according to claim 1, further comprising:

measuring a standard specimen by using the analysis device to acquire a spectrum of the standard specimen; and determining the positional relationship between the specimen and the spectroscopic element and the positional relationship between the spectroscopic element and each of the plurality of detection regions based on the acquired spectrum of the standard specimen.

5. An analysis device comprising:

a spectroscopic element that diffracts a signal generated from a specimen by irradiating the specimen with a primary beam;

a detector that detects the signal diffracted by the spectroscopic element; and a spectrum generation unit that generates a spectrum of the signal based on an output signal from the detector, the detector having a plurality of detection regions arranged in an energy dispersion direction, and the spectrum generation unit executing processing for:

determining energy of the signal detected in each of the plurality of detection regions based on a positional relationship between the specimen and the spectroscopic element and a positional relationship between the spectroscopic element and each of the plurality of detection regions;

measuring the specimen by using the analysis device to acquire a spectrum of the specimen;

setting an energy axis of the spectrum of the specimen by using energy of the signal detected in each of the plurality of detection regions, the energy of the signal detected in each of the plurality of detection regions having been determined in the step of determining energy of the signal detected in each of the plurality of detection regions;

determining the positional relationship between the specimen and the spectroscopic element based on the spectrum of the specimen;

redetermining energy of the signal detected in each of the plurality of detection regions based on the determined positional relationship between the specimen and the spectroscopic element; and correcting the energy axis of the spectrum of the specimen based on the redetermined energy of the signal detected in each of the plurality of detection regions.

* * * * *

UNITED STATES PATENT AND TRADEMARK OFFICE
CERTIFICATE OF CORRECTION

PATENT NO. : 11,131,638 B2  
APPLICATION NO. : 16/716859  
DATED : September 28, 2021  
INVENTOR(S) : Takanori Murano Page 1 of 1

It is certified that error appears in the above-identified patent and that said Letters Patent is hereby corrected as shown below:

On the Title Page

Column 2, Item (56) Other Publications, Line 9, delete "Souice" and insert -- Source --

In the Claims

Column 15, Line 39, Claim 3, delete "d(sin α" and insert -- d(sinα --

Column 15, Line 40, Claim 3, delete "a" and insert -- α --

Column 15, Line 45, Claim 3, delete "X" and insert -- λ --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*